Nov. 8, 1938.  H. A. WADMAN  2,136,346

GLASS MELTING TANK WALL STRUCTURE AND BLOCK

Filed June 12, 1937

Inventor:
Harold A. Wadman
by Brown & Parham
Attorneys

Witness:
W. B. Thayer.

Patented Nov. 8, 1938

2,136,346

UNITED STATES PATENT OFFICE 2,136,346

GLASS MELTING TANK WALL STRUCTURE AND BLOCK

Harold A. Wadman, Hartford, Conn., assignor to Hartford-Empire Company, Hartford, Conn., a corporation of Delaware Application June 12, 1937, Serial No. 147,847

3 Claims. (Cl. 49—54)

It is usual to construct the walls of a glass melting tank of refractory blocks or bricks which have rectangular inner or exposed faces, next to the glass. Consequently, the corner portions of the blocks are right angular at the exposed faces of such blocks and the joints between adjacent blocks all extend in one of two directions which are at right angles with each other. One of these directions is the direction of flow of the glass in the tank and the other is at right angles therewith.

The walls of a tank of the construction above described are subject to relatively rapid wear at the joints between adjacent blocks. The component blocks also frequently spall and break or crack along lines extending across their right angular corner portions, thus producing further places at which the wearing away of the blocks will be relatively rapid and at which the walls will be relatively weak. As a result, these walls soon become unfit for service and must be repaired or replaced.

I have discovered that the walls of a glass melting tank can be made more resistant to wear at the joints between the blocks of their glass contacting or exposed surfaces and more resistant to spalling and breakage or cracking of the component blocks simply by forming such walls of blocks which are suitably shaped at their exposed faces so that all the corner portions of each block will be obtusely angled and so that the joints between adjacent blocks will be relatively short or of slight linear extent in relation to the areas of the exposed faces of the blocks and will form zig-zag lines which extend in directions oblique to the direction of flow of the glass in the tank.

Figure 1:
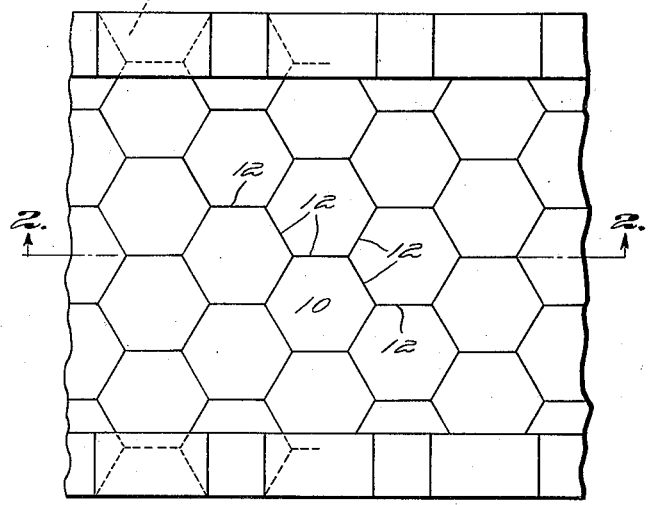
Figure 2:
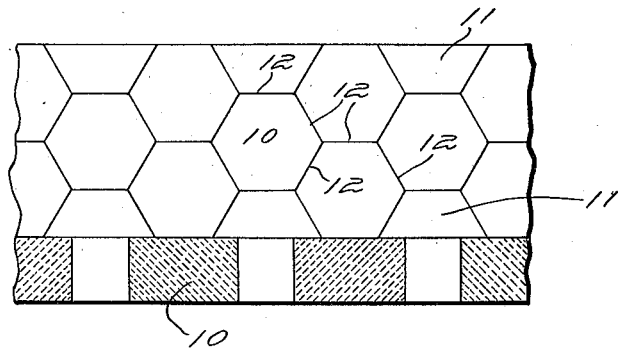

In the accompanying drawing:

Figure 1 is a plan view of fragmentary portions of side walls and bottom of a glass melting tank, constructed in accordance with the present invention of blocks of the shape preferred by me; and Fig. 2 is a longitudinal section through the bottom wall structure shown in Fig. 1, the view being approximately along the line 2—2 of Fig. 1.

The side and bottom melting tank walls which are partially shown in the accompanying drawing comprise refractory blocks 10 which are hexagonal in shape. That is, each block 10 is formed with similar hexagonal opposite inner or exposed and outer faces and with six similar side walls, each of which extends at an angle of 120° with the adjacent side walls of the block and at right angles with the opposite faces of the block. Halves of such hexagonal blocks, designated 11, may be used as filler blocks at the lines of juncture between the side walls and the bottom wall of the tank and also at the top of the glass contacting side walls. It of course will be understood that the complete tank would include a super-structure (not shown) which may be constructed in any suitable known way of any suitable material or materials. Also, the walls shown may be backed by insulating refractory walls.

If desired, the bottom wall might be constructed of whole, hexagonal blocks only, portions of certain of such blocks at the edges of the bottom then extending beyond the adjacent vertical walls of the tank.

It will be noted that the line of juncture, such as indicated at 12, of each block 10 or 11 with any adjacent block is approximately one-sixth the perimeter of the block and is of but slight linear extent in relation to the area of such block. Also, such line of juncture meets the lines of juncture between other sides of the same block and other blocks or the lines of juncture between adjacent sides of other blocks at obtuse angles, which, in the illustrative embodiment of the invention shown in the drawing, are all 120°. Any continuous series of joints or lines of juncture between component blocks of the same wall thus will extend in a zig-zag line which is generally oblique to the direction of length of the tank and therefore to the direction of flow or movement of the glass in contact with such wall. Also, each angular portion of each of the component hexagonal blocks will be relatively wide, being more than 90° in extent, at the exposed face thereof and thus will be unaffected by thermal shocks and stresses which would cause cracks or lines of cleavage across the narrower right angular portions of rectangular blocks of prior tank wall structures.

It will be understood that suitable refractory cement or joint material may be employed to seal the joints between adjacent blocks.

The features of the invention which produce advantages over former tank wall structures, some of which hereinbefore have been pointed out, may be obtained by the use of blocks which may vary in shape from those shown in the drawing and particularly described herein. Also, the wall construction may be different in details from those shown and described. The invention, therefore, is not to be limited beyond the terms of the appended claims. The word "wall" as used in the foregoing specification and in the appended claims includes the bottom of the tank.

I claim:

1. A glass melting tank wall comprising closely juxtaposed refractory blocks having hexagonal faces at the glass contacting or exposed surface of said wall.

2. A refractory block adapted for use in the construction of a glass melting tank wall, said block having a hexagonal face adapted to form a portion of the glass contacting or exposed inner face of said wall.

3. A refractory block adapted for use in the construction of a glass melting tank wall, said block having similar opposite hexagonal faces and similar sides.

HAROLD A. WADMAN.